Aug. 17, 1943.   E. W. DAVIS   2,327,025
RESISTANCE UNIT
Filed Feb. 27, 1941
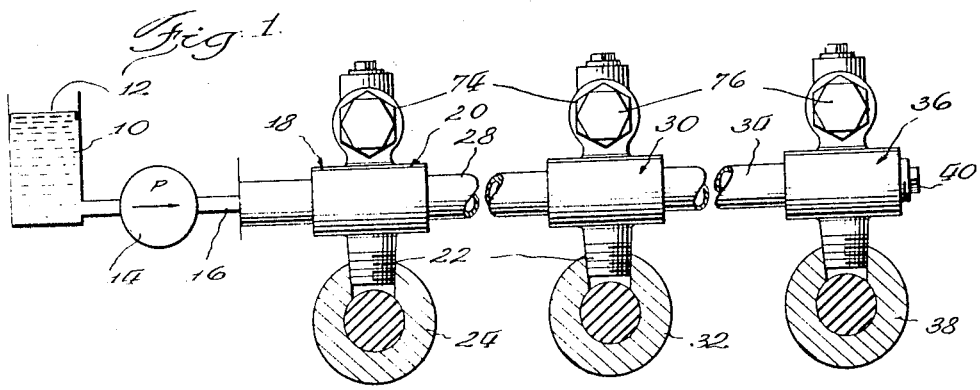
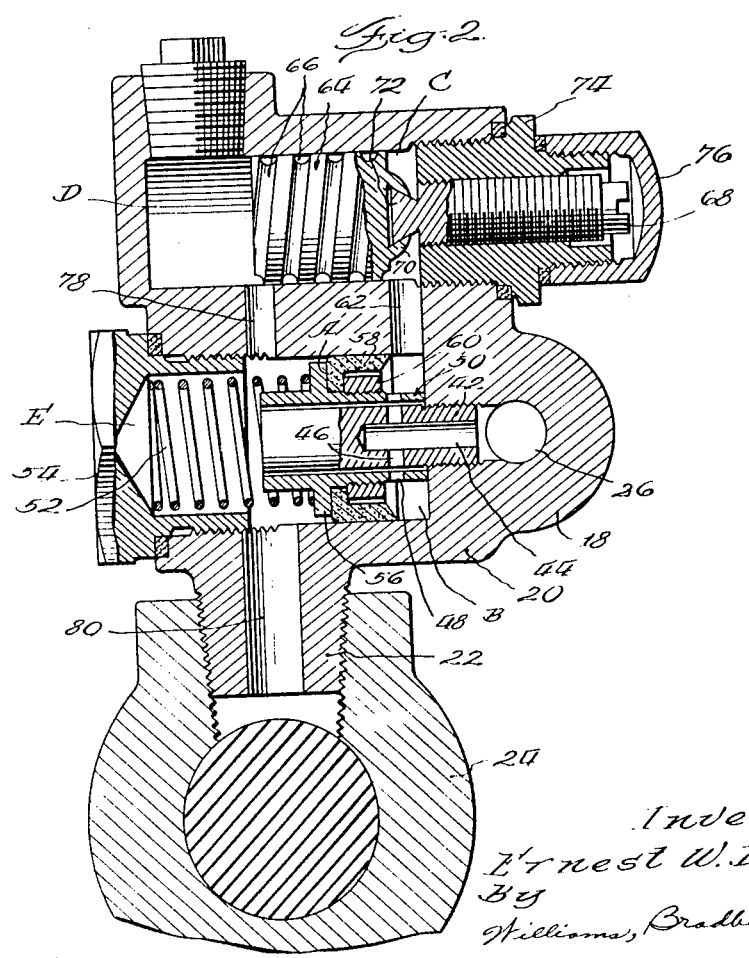
Inventor
Ernest W. Davis
By
Williams, Bradbury, & Hinkle
Attys Patented Aug. 17, 1943

2,327,025

UNITED STATES PATENT OFFICE 2,327,025

RESISTANCE UNIT

Ernest W. Davis, River Forest, Ill., assignor to Stewart-Warner Corporation, Chicago, Ill., a corporation of Virginia Application February 27, 1941, Serial No. 380,874

5 Claims. (Cl. 184—7)

My invention relates to resistance units, and more particularly to resistance units of the type adapted to be incorporated in lubricating systems for distributing lubricant in predetermined ratios among the various bearings supplied by the lubricating system.

In lubricating systems of the resistance type it has heretofore been attempted to make the resistance units associated with each bearing provide sufficient resistance so that the amount of lubricant supplied to the individual bearings will be independent of variations in the resistances of the bearings themselves. This has necessitated the use of resistance units affording high resistance to the flow of lubricant and has made necessary the use of either a high lubricant pressure in the system or a prolonged application of lubricant pressure in order to supply adequate quantities of lubricant to the bearing surfaces.

An object of my invention is to provide a resistance unit which automatically compensates for variations in bearing resistance.

Another object of my invention is to provide a new and improved resistance unit which may be easily adjusted to give any desired resistance.

Another object of my invention is to provide a new and improved resistance unit which may be easily and inexpensively manufactured and which will be reliable and effective in use.

Other objects and advantages will become apparent as the description proceeds.

In the drawing,

Fig. 1 is a diagrammatic view of a lubricating system incorporating my novel resistance units; and, Fig. 2 is a vertical section through a resistance unit embodying my invention.

In Fig. 1, I have illustrated a lubricating system comprising a grease container 10 having a follower plate 12 and communicating with a pump 14 which may be either manually or power operated. The pump withdraws the lubricant from the container 10 and forces it through a conduit 16 to the first resistance unit 18. The resistance unit 18 comprises a casting 20 provided with a threaded nipple 22 adapted to be threaded into a bearing part 24, although in some instances it may be preferable to locate the resistance unit 18 some distance from its bearing 24 and connect the discharge outlet of the nipple with the bearing by means of a pipe or other conduit, as is well understood in the art.

The pipe 16 conducts the lubricant to one end of a transverse passage 26 formed in the casting 20. The other end of this passage 26 is connected by a conduit 28 to a second resistance unit 30, illustrated as being attached to a bearing 32. The resistance unit 30 is similar to the resistance unit 18 and, likewise, has a transverse passage connecting the conduit 28 with the conduit 34 leading to a third resistance unit 36 attached to a bearing 38. In Fig. 1 I have shown a plug 40 as closing the outlet end of the transverse passage in the resistance unit 36, but it is to be understood that the number of resistance units utilized in any particular lubricating system embodying my invention will depend upon the number of bearings supplied with lubricant by the system and that any desired number of resistance units can be utilized in any particular lubricating system.

Furthermore, in the particular system illustrated in Fig. 1, the several resistance units are illustrated as being connected to conduits so arranged that they form, in effect, a single, continuous conduit; whereas in some instances it may be desirable to provide a manifold type of piping arrangement wherein the pump discharges into a manifold from which a plurality of pipes or conduits lead in parallel to one or more resistance units supplied by each pipe. Other optional piping arrangements will readily occur to those skilled in the art.

Referring to Fig. 2, it will be seen that a valve part 42 is threaded into the casting 20 and has an inlet passage 44 communicating with the passage 26. The inlet passage 44 connects with a transverse bore 46, illustrated in Fig. 2 as being in alignment with the valve ports 48 in a sleeve 50 slidably mounted on the nipple 42. The sleeve 50 is normally maintained in the position shown by a spring 52 confined between the plug 54 threadedly attached to the casting 20 and a flange 56 integral with the sleeve 50. The sleeve 50 forms part of a piston structure, designated generally by the letter A, and carries a cup washer 58 confined between the flange 56 and ferrule 60 threadedly secured to the sleeve 50.

Lubricant entering the resistance unit by way of passages 26 and 44 passes through bore 46 and ports 48 into the chamber B containing piston A. A duct 62 connects the chamber B with a cylindrical chamber C containing a plug 64 having a helical groove 66 which cooperates with the wall of the chamber C to provide a high resistance passage for the flow of the lubricant. The effective length of this resistance passageway can be varied by shifting the position of the resistance plug 64 in the chamber C to give any desired resistance value to the resistance unit.

In order to permit shifting of the resistance plug 64, I have attached this resistance plug to a screw 68 by means of a rotative connection formed by turning over a cylindrical extension 70 on the forward end of the plug 64 so that this extension engages the enlarged end of a tapered rearward extension provided by the screw 68. This construction causes the plug 64 to follow the longitudinal movements of the screw 68, but permits rotation of the screw without corresponding rotation of the plug 64.

The screw 68 is threaded into a sleeve 74 which, in turn, is screwed into the casting 18. A cap 76 protects the screw 68 against accidental misadjustment.

The lubricant flowing through the helical passage 66 passes into the rearward portion D of the cylindrical chamber C and flows through duct 78 into chamber E at the rear of the piston A. Bore 80 in nipple 22 connects chamber E with the bearing surfaces.

In the foregoing description, no particular reference was made to the sealing washers interposed between the various parts of my novel resistance unit to prevent leakage therebetween since these washers or gaskets may be of any conventional type and material.

In the operation of the lubricating system illustrated in the drawing, the pump 14 withdraws grease from the container 10 and forces it through the conduits to the several resistance units which are simultaneously supplied with lubricant, and since these resistance units are identical in construction, it will suffice to describe the operation of the resistance unit 18 which is shown in section in Fig. 2.

Lubricant from the passage 26 flows into the inlet passage 44 and thence through bore 46 and ports 48 to chamber B, and from chamber B the lubricant passes through duct 62 to chamber C where it enters the inlet end of the helical groove 66 provided by the resistance plug 64. This helical passageway offers high resistance to the flow of lubricant therethrough and the force available to overcome this resistance is the force exerted by the spring 52 in holding the piston A in the right-hand position shown in Fig. 2 of the drawing.

The lubricant is supplied through the inlet passage 44 faster than it can flow through the resistance passageway 66 under the maximum force permitted by the spring 52, with the result that lubricant pressure is built up in the chamber B and the piston A is moved backwardly to cut off inflow of lubricant through ports 48. The flow of lubricant through the helical passageway 66 thus proceeds at a definite rate of speed, depending upon the viscosity and temperature of the lubricant and as the lubricant in chamber B passes to chamber C and thence through the helical passageway, the piston A moves to the right under the influence of spring 52 and admits more lubricant to the chamber B. This cycle of operation continues as long as the pump P supplies lubricant under pressure.

The lubricant passing through the helical passageway 66 passes into the rearward portion D of chamber C, thence through duct 78 to chamber E and through bore 80 to the bearing. Any resistance which the bearing offers to inflow of lubricant results in a back pressure in the chamber E which tends to move the piston A to the right and resists the pressure created in chamber B by the lubricant therein. The resistance in chamber E varies with the resistance of the bearing, and the difference in pressure between chambers B and E is determined by the force of the spring 52 so that the force of this spring is the force available for creating flow through the resistance passageway 66, regardless of the resistance or lack of resistance of the bearing 24. By selecting a spring 52 of predetermined strength and a resistance plug 64 of predetermined resistance, any desired rate of flow can be obtained for any given adjustment of the plug 64. It will be understood that the springs 52 in the various resistance units of a given lubricating system are all of the same strength and the differences in lubrication requirements of the various bearings are accommodated by adjusting the positions of the resistance plug 64 in the various resistance units. In every instance, the flow of lubricant to a particular bearing will be determined by the position of the resistance plug in the resistance unit through which that bearing is supplied and will be independent of the resistance offered by the bearing itself.

While I have illustrated a lubricating system utilizing grease as a lubricant, it will be understood that my invention may be incorporated in a lubricating system utilizing oil or may be embodied in a liquid distribution system wherein the purpose of distributing the liquid has no relation to lubrication. In fact, my invention is capable of use in any liquid distributing system wherein the liquid is supplied to two or more points simultaneously in predetermined relative quantities.

The drawing illustrates only a single embodiment of my invention, but it should be understood that my invention may assume numerous forms and that various modifications may be made within the scope of the appended claims.

I claim:

1. A resistance unit comprising a casting having a nipple for attachment to a bearing and a pair of cylindrical chambers arranged in parallel relationship, a valve part secured to said casting and projecting into one of said chambers, a piston in said last-named chamber slidable on said valve part, said valve part providing an inlet passage for said chamber, said valve part and said piston providing a valve controlling communication between said chamber and said inlet, a plug closing the opposite end of said chamber, a spring interposed between said plug and piston, a cylindrical plug in the other chamber having a helical groove cooperating with the wall of said chamber to provide a resistance passageway, a sleeve closing one end of said other chamber, a screw adjustable in said sleeve, a rotatable connection between said screw and said last named plug, a cover carried by said sleeve and protecting said screw against accidental misadjustment, a duct connecting the inlet ends of said chambers, a second duct connecting the outlet ends of said chambers, and a bore in the nipple part of said casting for connecting the outlet end of the first-mentioned chamber with a bearing surface.

2. A resistance unit comprising a casting having a nipple for attachment to a bearing and a pair of cylindrical chambers arranged in parallel relationship, a valve part secured to said casting and projecting into one of said chambers, a piston in said last-named chamber slidable on said valve part, said valve part providing an inlet passage for said chamber, and said valve part and piston providing a valve controlling communication between said chamber and said inlet, a plug closing the opposite end of said chamber, a spring interposed between said plug and piston, a cylindrical plug in the other chamber and having a helical groove cooperating with the wall of said chamber to provide a resistance passageway, means for adjusting said last named plug to vary its effective resistance, a duct connecting the inlet ends of said chambers, a second duct connecting the outlet ends of said chambers, and a bore in the nipple part of said casting for connecting the outlet end of the first-mentioned chamber with a bearing surface.

3. A resistance unit comprising a casting having a pair of cylindrical chambers arranged in parallel relationship, a valve part secured to said casting and projecting into one of said chambers, a piston in said last-named chamber slidable on said valve part, said valve part providing an inlet passage for said chamber, and said valve part and piston providing a valve controlling communication between said chamber and said inlet, a spring urging said piston toward said inlet, a cylindrical plug in the other chamber and having a helical groove cooperating with the wall of said chamber to provide a resistance passageway, a duct connecting the inlet ends of said chambers, and a second duct connecting the outlet ends of said chambers.

4. A resistance unit of the class described, comprising a body having a pair of cylindrical chambers arranged in parallel relationship, a valve part projecting into one of said chambers, a piston in said last-named chamber slidable relative to said valve part, said valve part providing an inlet passage for said last-named chamber and said valve part and piston providing a valve controlling communication between said last-named chamber and said inlet, a spring urging said piston toward said inlet, means in said other chamber providing a resistance passageway, a duct connecting the inlet ends of said chambers, and a second duct connecting the outlet ends of said chambers.

5. A resistance unit of the class described, comprising a body having a pair of chambers, a valve part projecting into one of said chambers, a piston in said last-named chamber slidable relative to said valve part, said valve part providing an inlet passage for said last-named chamber and said valve part and piston providing a valve controlling communication between said last-named chamber and said inlet, a spring urging said piston toward said inlet, means in said other chamber providing a resistance passageway, a duct connecting the inlet ends of said chambers, and a second duct connecting the outlet ends of said chambers.

ERNEST W. DAVIS.